US009034128B2

(12) United States Patent
Lea et al.

(10) Patent No.: US 9,034,128 B2
(45) Date of Patent: May 19, 2015

(54) FITTING DOUBLERS USING GAP MAPPING (75) Inventors: Scott W. Lea, Renton, WA (US); Gary E. Georgeson, Federal Way, WA (US); Michael D. Fogarty, Auburn, WA (US); Michael W. Evens, Burien, WA (US); Jeffrey M. Hansen, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 857 days.

(21) Appl. No.: 12/183,045

(22) Filed: Jul. 30, 2008

(65) Prior Publication Data

US 2009/0154775 A1 Jun. 18, 2009

Related U.S. Application Data (63) Continuation-in-part of application No. 11/957,767, filed on Dec. 17, 2007, now Pat. No. 8,324,911.

(51) Int. Cl.
B32B 41/00 (2006.01)
G01B 11/14 (2006.01)
G01B 11/24 (2006.01)
B64F 5/00 (2006.01)

(52) U.S. Cl.
CPC ............... *G01B 11/14* (2013.01); *G01B 11/24* (2013.01); *B64F 5/0009* (2013.01)

(58) Field of Classification Search
USPC ............ 156/64, 94, 98, 286; 264/36.1, 36.22; 29/402.09, 402.11; 382/108
See application file for complete search history.

(56) References Cited

U.S. PATENT DOCUMENTS

| | | | | |
|---|---|---|---|---|
| 5,868,886 A * | 2/1999 | Alston et al. | | 156/98 |
| 6,000,801 A * | 12/1999 | Dillon et al. | | 353/28 |
| 6,045,651 A * | 4/2000 | Kline et al. | | 156/285 |
| 6,174,392 B1 * | 1/2001 | Reis | | 156/58 |
| 2003/0080251 A1 * | 5/2003 | Anast | | 244/119 |
| 2004/0236454 A1 * | 11/2004 | Weisser | | 700/123 |
| 2006/0108058 A1 * | 5/2006 | Chapman et al. | | 156/245 |

FOREIGN PATENT DOCUMENTS

WO WO 2007/034197 A1 3/2007

OTHER PUBLICATIONS

PCT Search Report US 2009/0049162, The Boeing Company, Jun. 30, 2009.
Manufacturer's brochure "FARO Laser ScanArm", from FARO, Inc. www.faro.com.
Manufacturer's brochure "NDE of Composite Bonded Doublers", R.C. Addison, Jr. Q.D. and K.L. Rugg, Rockwell Scientific Co., Thousand Oaks, CA 91360; P.S. Rutherford, Boeing Phantom Works, Seattle, WA 98104; International SAMPE Technical Conference, 33 (1-11), 2001.

* cited by examiner

*Primary Examiner* — George Koch
(74) *Attorney, Agent, or Firm* — Parsons Behle & Latimer (57) ABSTRACT

A method and apparatus are used to fit a metallic or composite doubler on an uneven surface. A three dimensional digital map of the gap between the doubler and the uneven surface is generated by digitally scanning the uneven surface. The digital map is then used to fabricate a stack of adhesive plies tailored to substantially fill the gap between the doubler and the uneven surface.

29 Claims, 6 Drawing Sheets

FITTING DOUBLERS USING GAP MAPPING

CROSS REFERENCE TO RELATED APPLICATIONS

This application is a continuation-in-part of U.S. patent application Ser. No. 11/957,767 filed Dec. 17, 2007, now U.S. Pat. No. 8,324,911, the entire disclosure of which is incorporated by reference herein.

TECHNICAL FIELD

The disclosure generally relates to surface mapping, and deals more particularly with a method and apparatus for mapping gaps between a strengthening doubler and an uneven structure surface using digital scanning techniques, as well as a method of fitting the doubler to the uneven surface using stacked plies of adhesive.

BACKGROUND

Pre-cured composite doublers may be used as patches to repair, reinforce and/or strengthen both metallic and polymer-matrix composite aircraft structures, such as outer skins. In some cases, the doublers may comprise metal that is pre-formed to the shape of a surface to which it is to be applied. Doublers are also sometimes used to better distribute loads when added to a structure. The doublers may be bonded to the surface of the structure using a suitable adhesive in the form of one or more adhesive plies. It is normally important to achieve a good bond between the doubler and the structure across the entire area of the doubler. However, in some cases, the surface of the structure may be uneven, and/or contain one or more depressions which create a gap across the preformed doubler foot print onto the skin. The gap may be filled with sheet adhesive, but challenges may occur when the gap thickness varies. In order to assure a complete bond having maximum strength, the gaps should be filled with adhesive. Accordingly, it is necessary to determine the location and dimensions of the gaps in order to tailor the pattern of each ply of the adhesive in order to completely fill the gaps with adhesive.

Existing techniques, including manual mapping, for measuring gaps between a structure surface and a doubler are time consuming, and measurement results may depend upon the skill of the technician who makes the measurements and interprets the results. Capacitive blankets have been proposed for use in measuring the gaps, and are effective for a variety of applications. However, capacitive blankets may not be suitable for measuring gaps over large areas or surface areas that have steep or multiple contours, since the blanket may not precisely conform to all areas of the contoured surface.

Accordingly, there is a need for a method and apparatus for rapidly and reliably mapping the gaps between a doubler and the surface of a structure, especially where the surface is relatively large and/or is highly contoured. There is also a need for a method and apparatus for fabricating stacked plies of adhesive that are precisely patterned so as to completely fill all areas of the gap in order to assure a good bond between the doubler and the structural surface.

SUMMARY

In accordance with the disclosed embodiments, gaps between a doubler and a structural surface may be mapped across the entire area of the doubler, rapidly and reliably. A three dimensional digital map is generated by digitally scanning the structural surface to which the doubler is to be applied. After aligning the structure data set and the doubler data set, the resulting three dimensional map is then segmented into layers that generally correspond to the thickness and shape of adhesive plies that are stacked and arranged so that they completely fill the gaps. The doubler may be reverse engineered if a data set is not available or if an exact representation is necessary. The three dimensional map is generated using digital files and 3-D data processing software. Digital files representing the segmented adhesive layers may be used to control an automatic cutter which cuts patterned plies from a sheet of adhesive. Alternatively, full size patterns may be printed and used as guides for manually cutting adhesive plies from a sheet of adhesive. One advantage of the disclosed embodiments lies in the highly automated nature of the method for both producing the three dimensional gap map and using it to fabricate a stack of adhesive plies that is precisely tailored to completely fill the gap.

According to one disclosed embodiment, apparatus is provided for fabricating a stack of adhesive plies used for attaching a doubler to a surface on a structure. The apparatus comprises: a digital scanner for scanning the surface on the structure and producing a first set of digital data representing the contour of the surface; a second set of digital data representing a surface on the doubler intended to be attached to the surface on the structure; and, a computer for mapping the gap between the doubler surface and the surface on the structure using the first and second sets of digital data, and for segmenting the mapped gaps into layers corresponding to the adhesive plies. The apparatus may further include a cutter controlled by the computer for automatically cutting the adhesive plies from a sheet of adhesive, based on the pattern of the segmented layers. The digital scanner may be a laser or other optical scanner.

According to a method embodiment, fabricating a stack of adhesive plies used to attach a doubler to a surface on a structure, comprises: generating a first set of digital data representing the surface of the structure; generating a second set of digital data representing a surface on the doubler that is intended to be attached to the surface of the structure; mapping the gap between the doubler surface and the surface of the structure; segmenting the mapped gap into patterned layers corresponding to the adhesive plies; and, using the patterned layers to produce the adhesive plies. Generating the first and second sets of digital data may be performed by digitally scanning the surface of the structure and the surface of the doubler, or the surface of a tool used to form the doubler.

According to another method embodiment, fitting a doubler on a surface, comprises: generating a three dimensional digital map of the gap between the doubler and the surface; and, using the digital map to fabricate a stack of adhesive plies tailored to substantially fill the gap between the doubler and the surface.

According to a further method embodiment, applying a doubler to a surface of the structure comprises: forming a doubler having a surface intended to be applied to the surface of the structure; generating a map of the gap between the surface of the doubler and the surface of the structure; generating a three dimensional map of the gap between the surface of the doubler and the surface of the structure; segmenting the three dimensional map into a plurality of layers, each having a pattern; using the patterns to fabricate a stack of adhesive plies that substantially fill the gap; filling the gap with the stack of adhesive plies; and, placing the doubler on the surface of the structure overlying the stack of adhesive plies, Embodiments of the disclosure satisfy a need for method and apparatus for rapidly mapping the gaps between a doubler and a structural surface that is accurate, reliable and highly automated. The disclosed embodiments also satisfy the need for a method and apparatus for fabricating multiple plies of adhesive that are precisely patterned.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
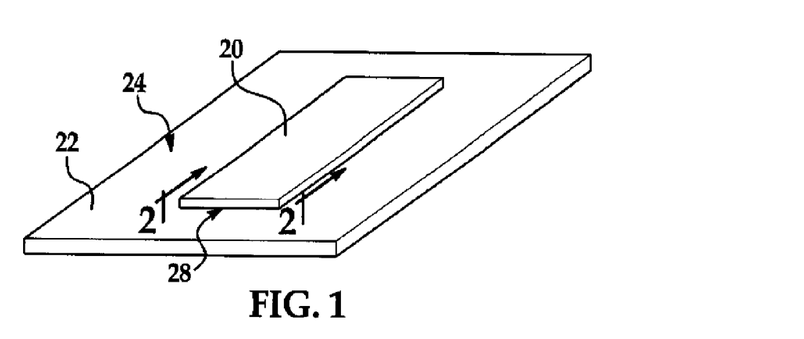
FIG. 1 is a perspective view of a composite doubler bonded to the surface of a structure.

Embodiments of the disclosure relate to a method and apparatus for fitting and applying a doubler 20 on the surface 24 of a structure 22 (FIG. 1). In the illustrated example, the doubler 20 comprises composite materials, however, it is to be understood that the disclosed embodiments may be used to fit and apply metal doublers as well. The structure 22 may comprise, without limitation, a metallic or composite skin of an aircraft requiring repair or reinforcement in the area where the doubler 20 is applied to the structure 22. In the illustrated example, the doubler 20 may comprise a stack of cured plies of reinforced synthetic resin, such as carbon-fiber epoxy, for example. Although both the doubler 20 and the structural surface 24 are shown as being flat in FIGS. 1 and 2, it is to be understood that they may be curved in one or more directions, or may comprises a combination of flat and curved surfaces. Where the doubler 20 is metal, the doubler 20 may be preformed to conform to the shape of the surface to which it is to be fitted and applied. Also, although the doubler 20 is shown as being rectangular in FIG. 1, it may be any of numerous other shapes to suit the particular application.

Figure 2:
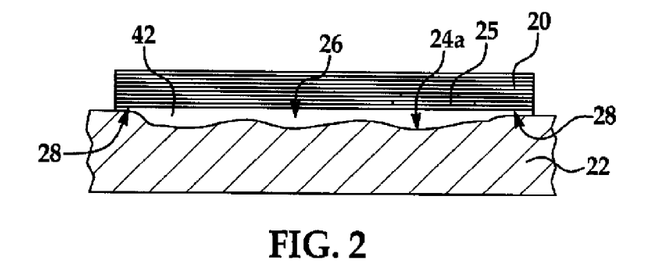
FIG. 2 is a sectional view taken along the line 2-2 in FIG. 1.

As best seen in FIG. 2, the surface 24 of the structure 22 may include uneven surface areas 24a which create one or more gaps 26 at the interface 28 between the doubler 20 and the structure surface 24. In accordance with the disclosed embodiments, the doubler 20 is bonded to the surface 24 by a suitable adhesive 42. As will be discussed in more detail below, the adhesive 42 may comprise a built-up stack 43 of adhesive plies 44 (see FIG. 8) that each have a shaped pattern such that the contour of adhesive ply stack 43 substantially matches the contour of the uneven surface 24a and therefore substantially completely fills the entire volume of the gap 26. Since the three dimensional (3-D) shape of the adhesive 42 formed by the adhesive ply stack 43 substantially matches that of the gap 26, a strong bond between the doubler 20 and the surface 24 is formed over the entire area of the interface 28.

Figure 3:
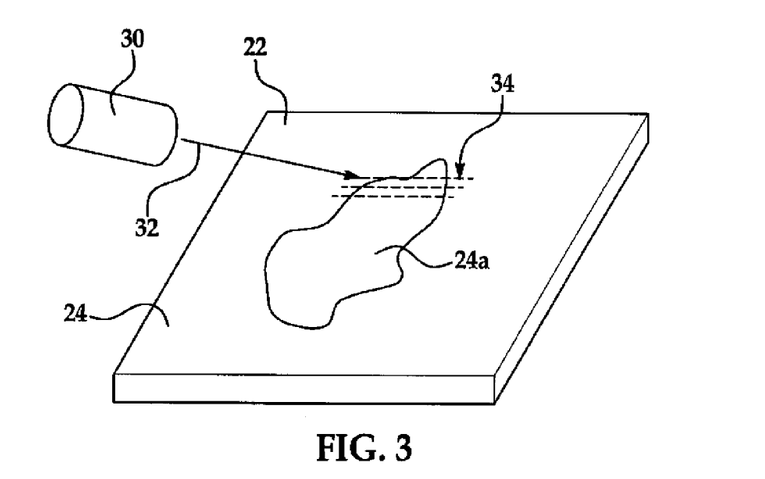
FIG. 3 is a perspective view illustrating digital scanning of uneven areas on the surface of the structure shown in FIGS. 1 and 2.
Figure 4:
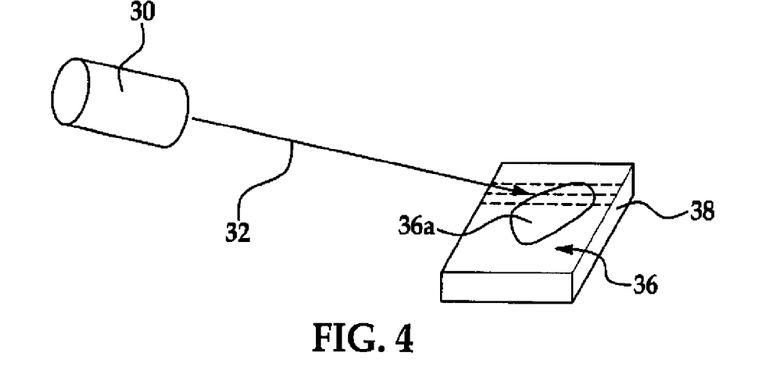
FIG. 4 is a perspective view similar to FIG. 3 but showing digital scanning of the surface of a tool used to form the doubler shown in FIG. 1.
Figure 5:
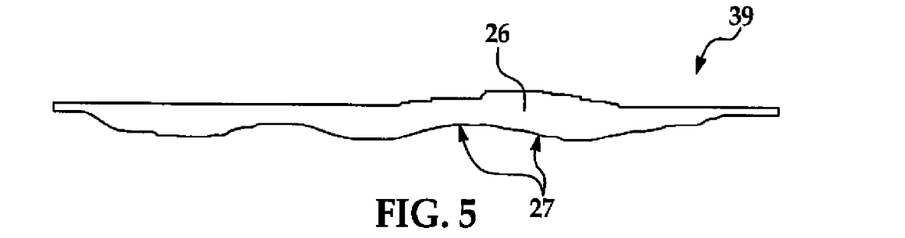
FIG. 5 is a cross sectional view of a three dimensional map of the gap formed between the doubler and the uneven surface of the structure.

Referring now to FIGS. 3 and 5, in accordance with the disclosed embodiment, a 3-D map 39 of the gap 26 (FIG. 2) is generated by digitally scanning the uneven surface areas 24a using a digital scanner 30 that scans an energy beam 32 in a scanning pattern 34 over the surface 24 of the structure 22. The digital scanner 30 may comprise any of various commercially available devices, such as a laser scanner of the type available, for example and without limitation, from FARO Technologies Inc., which comprises a laser line probe (not shown) mounted on a scanning arm (not shown) for movement about multiple axes. However, various other non-contact scanning devices may be employed. The digital scanner 30 generates a digital data file that represents a 3-D map 39 of the gap 26 which includes the contour 27 (FIG. 5) of the uneven surface 24a.

In some cases, it may be possible that the bottom face (not shown) of the doubler 20 in the area of the interface 28 (FIGS. 1 and 2) also may contain uneven surface areas 25. Accordingly, the digital scanner 30 may be used to scan the surface 36 of a lay-up tool 3B that is used to form the doubler 20. Any uneven surface areas in the tool 38 such as that indicated by the numeral 36a in surface 36 will produce a corresponding area of surface unevenness 25 (FIG. 2) on the doubler 20. Thus, by scanning the surface 36 of the tool 38, a digital data file is generated representing the 3-D contour of the uneven surface areas 36a, and thus of the uneven surface areas 25 on the doubler 20 that must be taken into account in determining the shape and dimensions of the adhesive 42 required to fill the gap 26 (FIG. 2). Alternatively, it may be possible to scan the bonding surface of the doubler 20 directly in order to identify areas of uneven surface areas 25 which are converted into a digital data file representing the uneven surfaces 25. In still another embodiment, a digital file representing the contours of the surface 36 of the tool 38 may be generated from a digital, 3-D CAD model of the tool 38.

As will be discussed below in more detail, commercially available software such, without limitation, Polyworks and Geomagic may be used to compare the two digital data files respectively representing the contours of the uneven surface areas 25 on the doubler 20 and those 24a on the structure surface 24, and to generate a 3-D map 39 of the gap 26, as shown in FIG. 5, and thus of the void that is to be filled with the adhesive 42.

Figure 6:
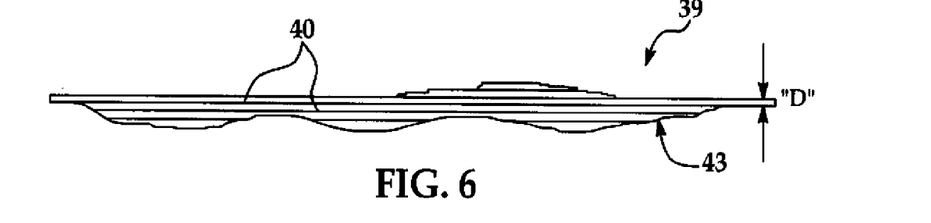
FIG. 6 is a view similar to FIG. 5 but showing the map having been segmented into patterned layers.
Figure 7:
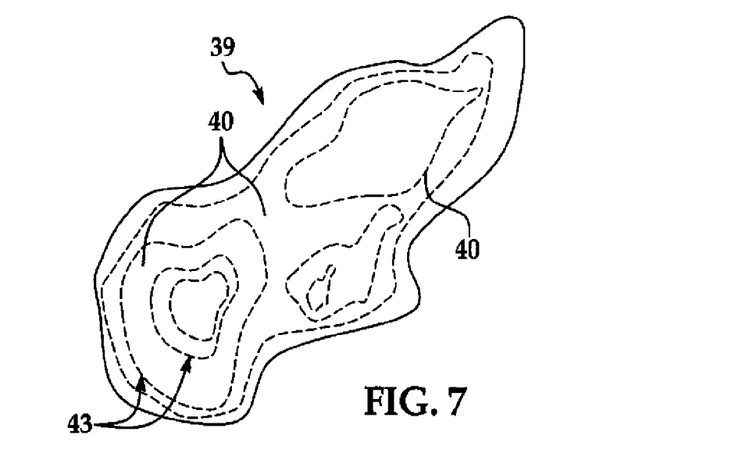
FIG. 7 is a plan view of another three dimensional gap map, and illustrating the outlines of the patterned layers.

Referring now to FIGS. 6 and 7, the 3-D map 39 of the gap 26 is then segmented into patterned layers 40 each having a predefined thickness "D" and a distinct outer boundary pattern 43 (see FIG. 7). The thickness D may generally correspond to the thickness of each adhesive ply 44 in the ply stack 43, however, in some applications it may be useful to vary the thickness D for at least certain of the patterned layers 40 in order to more closely fit the patterned layers 40 to the contour of the uneven surface areas 24a. Segmenting the 3-D map 39 of the gap 26 results in a segmented 3-D map 39 (FIGS. 6 and 7) which is in effect, a topographic map wherein the boundary patterns 43 form the topographic lines of each layer 40.

Figure 8:
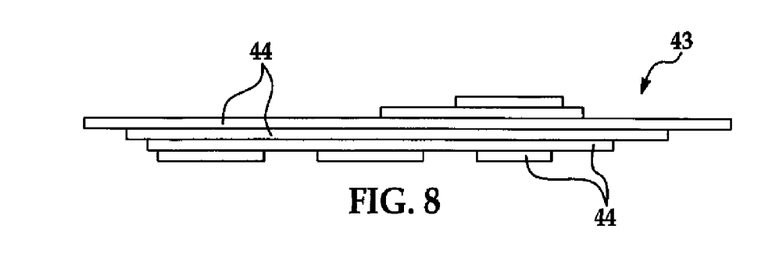
FIG. 8 is a cross sectional view of a stack of plies used to fill the gap between the doubler and the uneven surface of the structure based on the map shown in FIG. 5.

Referring now also to FIG. 8, using the pattern, thickness and position of each of the segmented layers 40, individual plies 44 of adhesive may be cut from a sheet (not shown) of adhesive and arranged to form a stack 43 substantially matching the contours of the 3-D map 39. Thus, the ply stack 43 has surface contours substantially matching that of the gap 26 between the doubler 20 and the structure surface 24. During installation, the ply stack 43 is placed between the doubler 20 and the structure 22, thereby contacting essentially the entire surface areas of the interface 28 (FIGS. 1 and 2).

Figure 9:
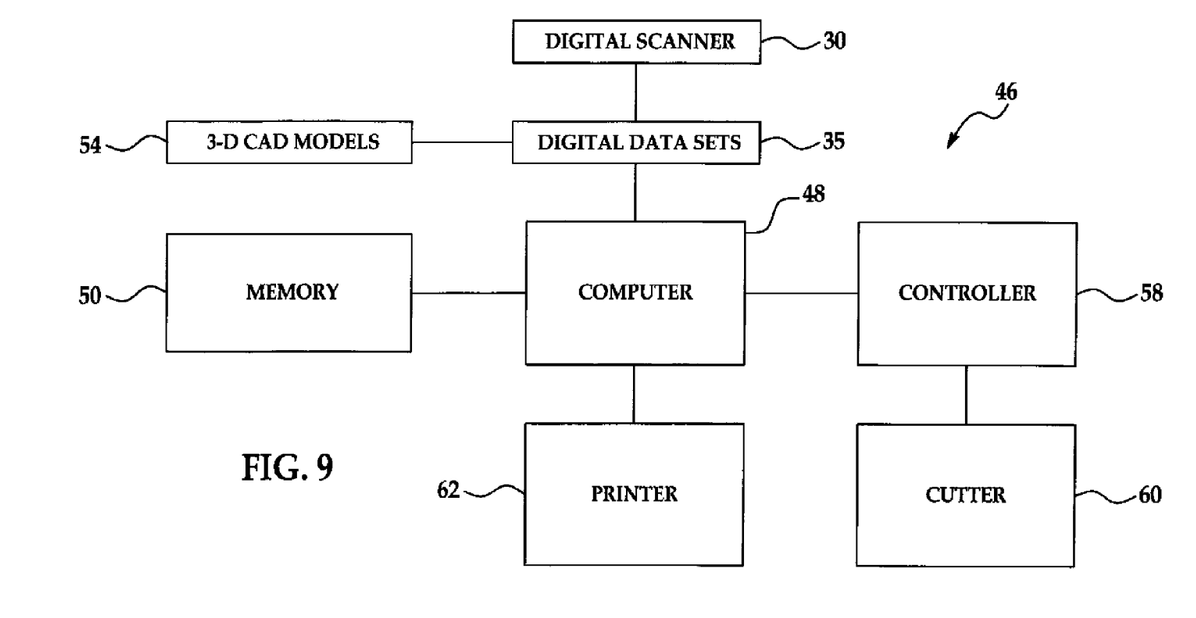
FIG. 9 is a block diagram of apparatus for generating the three dimensional gap map and for fabricating the stack of adhesive plies.

FIG. 9 illustrates apparatus generally indicated by the numeral 46 for fitting the doubler 20 to the structure 22. The apparatus 46 includes a computer 48 coupled with memory 50 for storing files and programs that are accessed and used by the computer 48. For example, the digital data sets 35 gathered from the digital scanner 30 or 3-D CAD models 54, may be processed with commercially available, imaging processing programs that may be used to manipulate digital data and carryout processes necessary to measure the gaps, generate the 3-D map, segment the layers 40 and output data representing the size, shape and location of the adhesive plies 44. The digital scanner 30 sends the scanned digital data set 35 to the computer 48 where it may be used in various calculations.

In one embodiment, the adhesive plies 44 may be automatically cut from a sheet (not shown) of adhesive material using a cutter 60 operated by a controller 58 which receives data and control instructions from the computer 48. In some applications, where the thickness D of the patterned layers 40 varies (FIG. 6), the adhesive plies 44 may be cut from more than one sheet of adhesive having differing thicknesses. In another embodiment, a printer 62 is coupled with the computer 48 and is operative to print full size physical patterns that may be cut out and/or followed in order to manually cut the adhesive plies 44 from a sheet of adhesive material.

Figure 10:
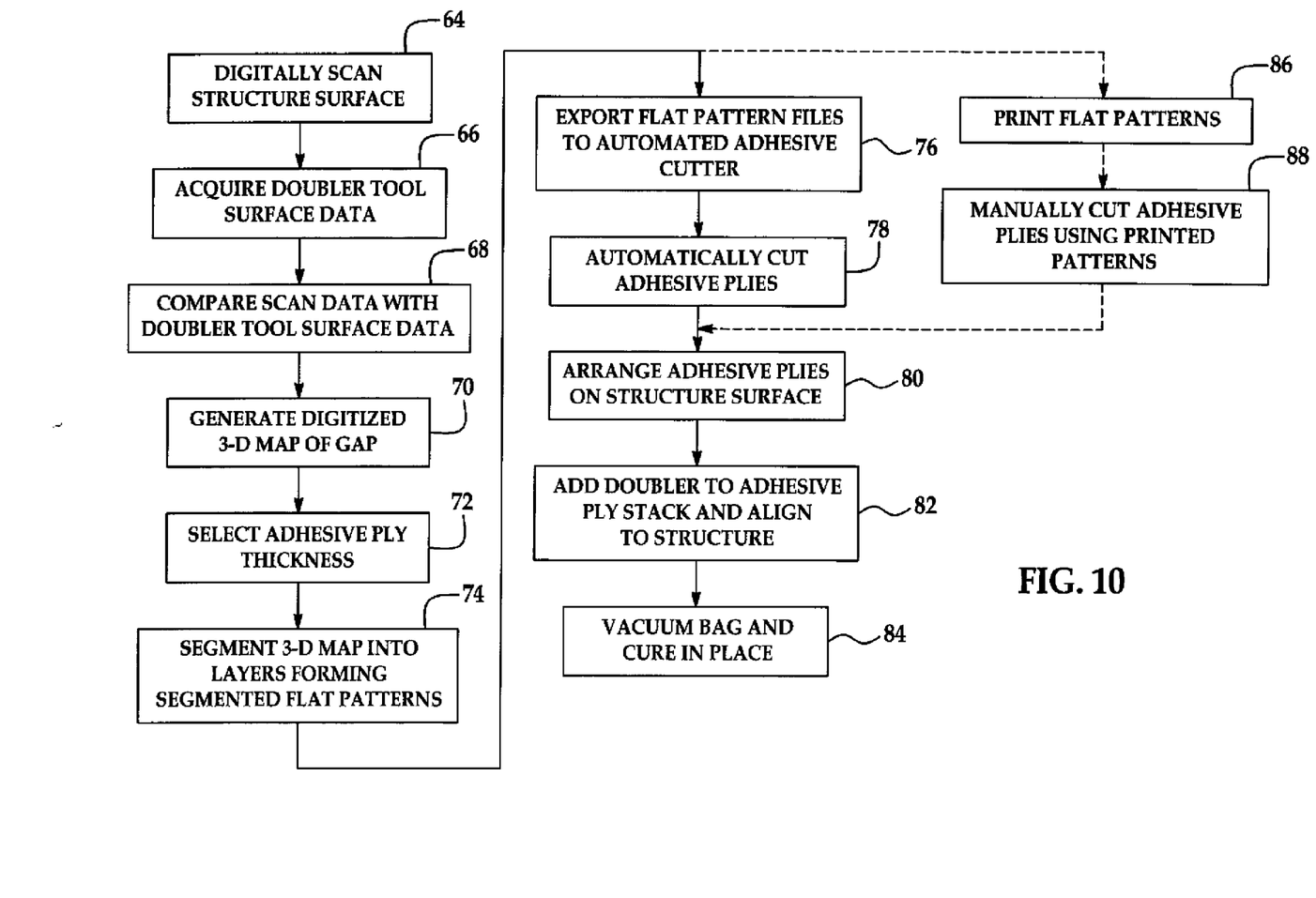
FIG. 10 is a flow diagram of a method for fitting and applying a doubler on the surface of the structure.

Attention is now directed to FIG. 10 which illustrates the steps of a method for fitting the doubler 20 on the structure 22. Beginning at step 64, the surface 24 is digitally scanned in order to produce a first digital data file that represents the contour of the uneven surface areas 24a on structure surface 24. At step 66, a second digital data file is generated which represents the surface contour of the doubler tool 38, or the doubler 20 itself. As previously discussed, this second digital data file may be developed using a CAD file representing a 3-D model of the doubler tool 38, or by scanning the surface 36 of the doubler tool 38, as described above in connection with FIG. 4.

At step 68, the digital data files generated in steps 64 and 66 are compared, and the results are used to generate the 3-D map 39 of the gap 26, at step 70.

At step 72, the thickness of the adhesive plies 44 may be selected, which generally corresponds to the thickness D of the segmented layers 40 shown in FIG. 6. As discussed above, more than one thickness may be selected for the adhesive plies 44. Based on the ply thickness selected at 72, the 3-D map 39 is segmented into layers that form flat patterns, as shown at step 74.

In one embodiment, full size flat patterns are printed out at step 86 and are then used at step 88 as guides to manually cut each of the adhesive plies 44. Alternatively, files representing the segmented 3-D map 39 may be exported to an automatic adhesive cutter 60, at step 76. The cutter 60 then automatically cuts each of the adhesive plies 44 to the predetermined size and shape.

The adhesive plies 44, having been cut to the appropriate size and shape, may then be arranged and stacked according to the 3-D map 39 (FIGS. 6 and 7), and the stack 43 is then placed between the doubler 20 and the surface 24 of the structure 22, as shown at step 82. The doubler 20 having been fitted to the surface 24 of the structure 22, the doubler 20 and the surface 24 surrounding the doubler 20 are vacuum bagged and are cured in place, as shown at step 84.

In some applications, as those skilled in the art will recognize, darts may be added to some of the adhesive layers 44 in order to accommodate the material properties of the adhesive layers 44. On nearly flat surfaces, the adhesive stacks 43 can be formed by laying down essentially flat layers of adhesive. With more contoured structure surfaces, however, the bulk of the adhesive layers 44 may require darting in order to minimize the number of layers 44 needed to produce the required shape. The darting may be automatically generated using pattern software.

It should be noted here that although the steps of the method embodiments disclosed above have been described as being carried out in a particular order for illustrative purposes, it is possible to perform the steps of these methods in various other orders.

Figure 11:
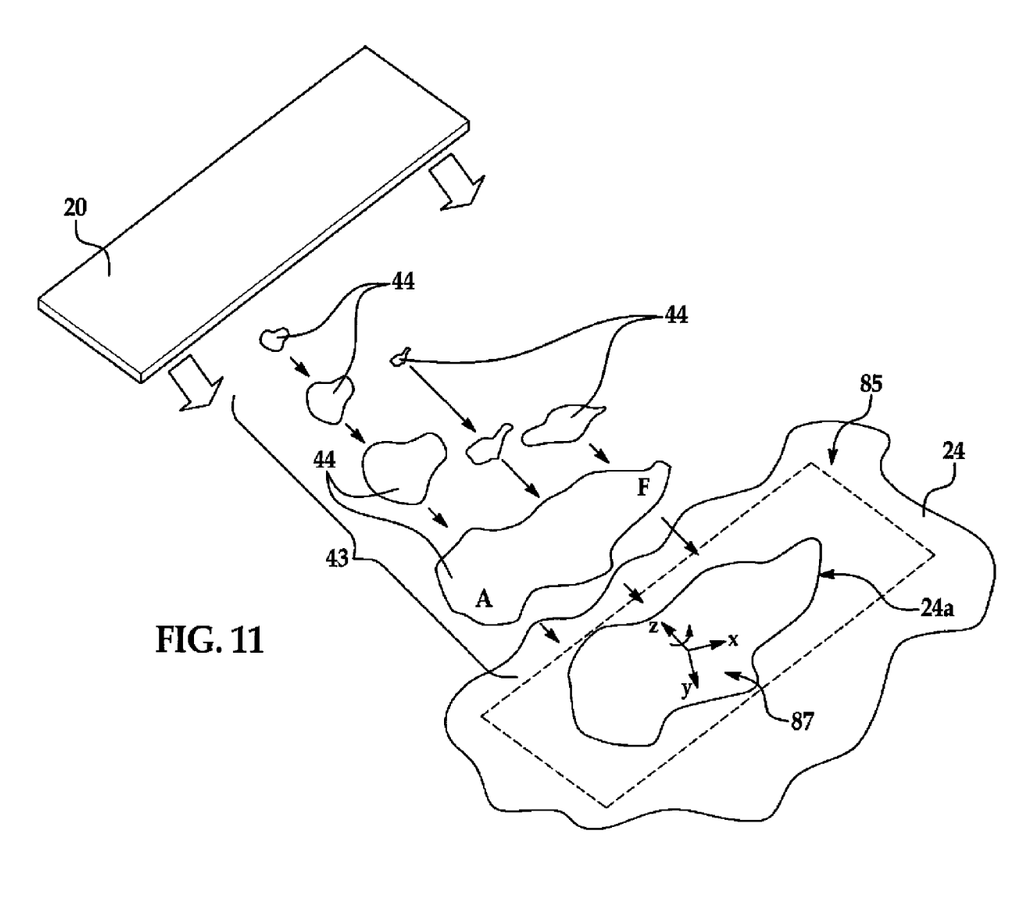
FIG. 11 is an exploded, perspective view showing how the adhesive plies may be arranged and oriented during installation of the doubler.

FIG. 11 illustrates, in exploded form, the stack 43 of adhesive plies 44 that may be placed between the doubler 20 and the surface 24, wherein the footprint of the doubler 20 on the surface 24 is indicated by the dashed line 85. The adhesive plies 44 may be assembled as a stack 43 before being placed between the doubler 20 and the surface 24, or they may be sequentially applied to either the doubler 20 or to the surface 24 (or a combination of both) before the doubler 20 is applied to the surface 24. As previously discussed the 3-D map 39 (FIG. 7) may be used as a guide to arrange and orient the adhesive plies 44, both relative to each other and relative to the intended placement position on surface 24. In order to assure proper placement and orientation of the adhesive plies 44, a coordinate system 87 may be used as a reference to locate the adhesive plies 44 within an XY plane corresponding the plane of the surface 24, and to properly orient their rotational position about a Z axis of the coordinate system 87, which in the illustrated example, extends normal to the surface 24. Additionally, in order to assist in the orientation process, each of the adhesive plies 44 may carry marks or indicia, indicated as "F" and "A" in FIG. 11, for example, to respectively designate fore and aft directions of orientation for each of the adhesive plies 44.

Figure 12:
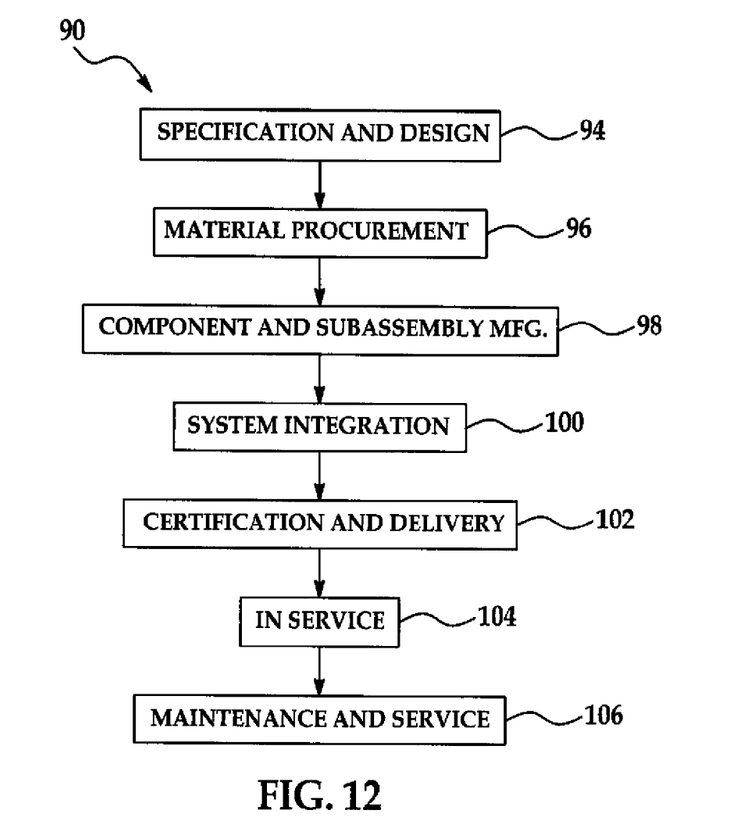
FIG. 12 is a flow diagram of aircraft production and service methodology.
Figure 13:
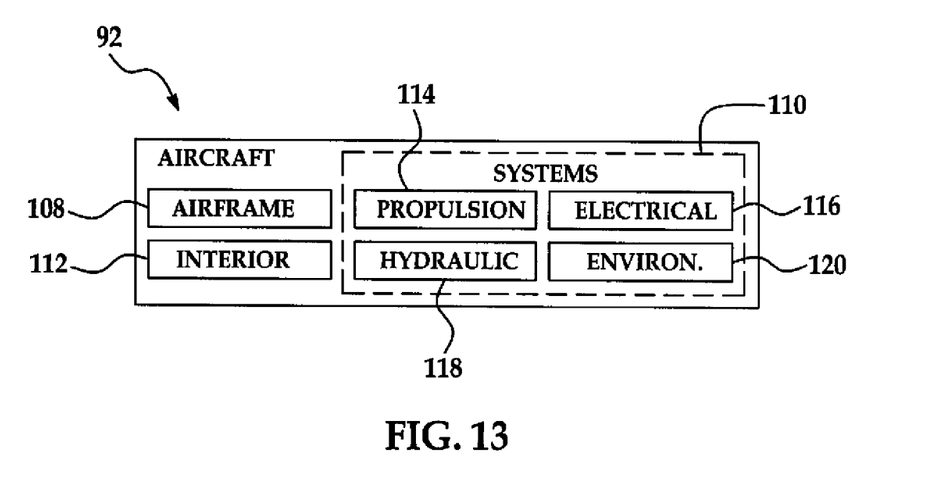
FIG. 13 is a block diagram of an aircraft.

Embodiments of the disclosure may find use in a variety of potential applications, particularly in the transportation industry, including for example, aerospace and automotive applications. Thus, referring now to FIGS. 12 and 13, embodiments of the disclosure may be used in the context of an aircraft manufacturing and service method 90 as shown in FIG. 12 and an aircraft 92 as shown in FIG. 13. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 90 may include specification and design 94 of the aircraft 92 and material procurement 96. During production, component and subassembly manufacturing 98 and system integration 100 of the aircraft 92 takes place. Thereafter, the aircraft 92 may go through certification and delivery 102 in order to be placed in service 104. While in service by a customer, the aircraft 92 is scheduled for routine maintenance and service 106 (which may also include modification, reconfiguration, refurbishment, and so on).

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 92 produced by exemplary method 90 may include an airframe 108 with a plurality of systems 110 and an interior 112. Examples of high-level systems 110 include one or more of a propulsion system 114, an electrical system 116, a hydraulic system 118, and an environmental system 120. Any number of other systems may be included. Although an aerospace example is shown, the principles of the disclosure may be applied to other industries, such as the automotive industry.

Apparatus and methods embodied herein may be employed during any one or more of the stages of the production and service method 90. For example, components or subassemblies corresponding to production process 98 may be fabricated or manufactured in a manner similar to components or subassemblies produced while the aircraft 92 is in service. Also, one or more apparatus embodiments, method embodiments, or a combination thereof may be utilized during the production stages 98 and 100, for example, by substantially expediting assembly of or reducing the cost of an aircraft 92. Similarly, one or more of apparatus embodiments, method embodiments, or a combination thereof may be utilized while the aircraft 92 is in service, for example and without limitation, to maintenance and service 106.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a stack of plies consisting of uncured adhesive material used to attach a doubler to a surface on a structure, comprising:
generating a first set of digital data representing the surface on the structure;
generating a second set of digital data representing a surface on the doubler that is intended to be attached to the surface of the structure;
mapping a gap between the doubler surface and the surface of the structure to generate a three dimensional map of said gap;
segmenting the three dimensional map into patterned layers, each layer having a thickness corresponding to a respective one of the plies consisting of uncured adhesive material to be produced; and
cutting the patterned layers from a sheet consisting of uncured adhesive material to produce the stack of plies, wherein the stack of plies consisting of uncured adhesive material fills the gap and bonds the doubler surface to the surface of the structure.

2. The method of claim 1, wherein:
the surface of the structure is uneven, and
generating the first set of digital data is performed by digitally scanning the uneven surface of the structure.

3. The method of claim 2 further comprising providing at least two different thicknesses of the patterned layers to adapt the stack of plies consisting of uncured adhesive material to contour to the uneven surface.

4. The method of claim 1, further comprising applying indicia to at least some of the plies consisting of uncured adhesive material to designate an orientation of the plies.

5. The method of claim 1, wherein generating the second set of digital data is performed by digitally scanning one of:
the surface of the doubler, and
a surface of a tool used to fabricate the doubler.

6. The method of claim 1, wherein mapping the gap between the doubler surface and the surface of the structure includes comparing the first and second sets of digital data.

7. The method of claim 1, wherein segmenting the mapped gap into patterned layers corresponding to the plies consisting of uncured adhesive material includes selecting a thickness for each of the plies consisting of uncured adhesive-material.

8. The method of claim 1, wherein:
segmenting the three dimensional map into patterned layers corresponding to the plies consisting of uncured adhesive material includes generating a file representing the patterns, and
cutting the patterned layers to produce the stack of plies consisting of uncured adhesive material includes using the file representing the patterns to automatically control a cutter used to cut the patterns from a sheet of uncured adhesive material.

9. The method of claim 1, wherein cutting the patterned layers to produce the stack of plies consisting of uncured adhesive material includes:
printing the patterns, and
using the printed patterns as guides for cutting the plies consisting of uncured adhesive material from a sheet consisting of uncured adhesive material.

10. The method of claim 1, further comprising:
using an automatically controlled cutter to cut the stack of plies consisting of uncured adhesive material from a sheet consisting of uncured adhesive material based on the shapes of the patterned layers.

11. The method of claim 1, wherein the gap is at an interface between the doubler and the surface on the structure.

12. The method of claim 11 further comprising the stack of plies consisting of uncured adhesive s-material bonding the surface of the doubler to the surface of the structure over an entire area of the interface.

13. A method of fitting a doubler on a surface, comprising:
generating a three dimensional digital map of a gap between the doubler and the surface;
segmenting the digital map into patterned layers, each layer having a thickness corresponding to a respective one of plies consisting of uncured adhesive material, wherein the patterned layers include more than one thickness; and
cutting a stack of plies from a sheet consisting of uncured adhesive material using the digital map, the stack of plies tailored to substantially fill the gap between the doubler and the surface; and
curing the stack of plies consisting of uncured adhesive material in place between the doubler and the surface.

14. The method of claim 13, wherein:
the surface is uneven, and
generating a three dimensional digital map includes digitally scanning the surface.

15. The method of claim 13, wherein generating the three dimensional digital map includes:
generating a first set of digital data representing the surface;
generating a second set of digital data representing a surface on the doubler that is intended to be fitted to the surface; and comparing the first and second sets of digital data.

16. The method of claim 15, wherein generating the second set of digital data is performed by digitally scanning one of:
the surface of the doubler, and
a surface of a tool used to fabricate the doubler.

17. The method of claim 15, wherein generating the first set of digital data includes using a laser to scan the surface.

18. The method of claim 13,
wherein using the digital map to fabricate the stack of plies consisting of ancured adhesive material includes cutting the plies consisting of uncured adhesive material from a sheet consisting of uncured adhesive material using the patterned layers as guides.

19. The method of claim 13, further comprising:
using the digital map to orient the plies consisting of uncured adhesive material relative to each other and to determine their order within the stack of plies consisting of uncured adhesive material.

20. The method of claim 13, wherein the gap has a volume and the stack of plies consisting of uncured adhesive material substantially completely fills the entire volume of the gap.

21. The method of claim 13, further comprising applying indicia to at least some of the plies consisting of uncured adhesive material to designate an orientation of the plies.

22. A method of applying a doubler to an uneven surface of a structure, comprising:
forming a doubler having a surface intended to be applied to the uneven surface of the structure;
generating a three dimensional map of a gap between the surface of the doubler and the uneven surface of the structure;
segmenting the three dimensional map into a plurality of layers each having a pattern, each layer having a thickness corresponding to a respective one of plies consisting of uncured adhesive material to be fabricated from a sheet consisting of uncured adhesive material;
cutting a stack of plies consisting of uncured adhesive material from a sheet consisting of uncured adhesive material using the pattern of layers, the stack of plies configured to substantially fill the gap;
filling the gap with the stack of plies consisting of uncured adhesive-material;
placing the doubler on the uneven surface of the structure overlying the stack of plies consisting of uncured adhesive-material; and
curing the stack of plies consisting of uncured adhesive material in place between the doubler and the uneven surface of the structure.

23. The method of claim 22, wherein generating the map of the gap includes:
generating a first set of digital data representing the uneven surface of the structure;
generating a second set of digital data representing the surface of the doubler; and
comparing the first and second sets of digital data.

24. The method of claim 23, wherein generating the first set of digital data includes digitally scanning the uneven surface of the structure.

25. The method of claim 23, wherein generating the second set of digital data includes digitally scanning the surface of the doubler.

26. The method of claim 23, wherein generating the second set of digital data includes digitally scanning a surface of a tool used to form the doubler.

27. The method of claim 22, further comprising applying indicia to at least some of the plies consisting of uncured adhesive material to designate an orientation of the plies.

28. A method of applying a doubler over a surface of an aircraft, comprising:
generating a first set of digital data representing the surface by digitally scanning the surface;
generating a second set of digital data representing a surface on the doubler;
generating a three dimensional map of a gap between the surface of the aircraft and the surface of the doubler, including comparing the first and second sets of digital data;
segmenting the three dimensional map into patterned layers, including generating a file representing the patterned layers, each digitally patterned layer having a thickness corresponding to a respective one of plies consisting of uncured adhesive material to be produced;
cutting a stack of plies from a sheet consisting of uncured adhesive-material, using the file representing the patterned layers;
filling the gap with the stack of plies consisting of uncured adhesive-material;
placing the doubler on the surface of the aircraft overlying the stack of plies consisting of adhesive-material; and
curing the stack of plies consisting of uncured adhesive material in place between the doubler and the surface of the aircraft.

29. The method of claim 28, further comprising applying indicia to at least some of the plies consisting of uncured adhesive material to designate an orientation of the plies.

* * * * *